United States Patent [19]
Lee

[11] 3,750,121
[45] July 31, 1973

[54] ADDRESS MARKER ENCODER IN THREE FREQUENCY RECORDING

[75] Inventor: Dae-Woo Lee, North Billerica, Mass.

[73] Assignee: Honeywell Information Systems Inc., Walthom, Mass.

[22] Filed: June 18, 1971

[21] Appl. No.: 154,519

[52] U.S. Cl. .................... 340/174.1 G, 340/347 DD
[51] Int. Cl. .................... G11b 5/00
[58] Field of Search .............. 340/347 DD, 174.1 G, 340/174.1 H; 346/74 M; 235/92

[56] References Cited

UNITED STATES PATENTS

| | | | |
|---|---|---|---|
| 3,488,662 | 1/1970 | Vallee | 346/74 M |
| 3,145,292 | 8/1964 | Scawaninger | 235/92 |
| 3,584,200 | 6/1971 | Layman | 235/92 |
| 3,623,074 | 11/1971 | Bailey | 340/174.1 X |
| 3,422,425 | 1/1969 | Vallee | 340/174.1 X |
| 3,623,041 | 11/1971 | MacDougall, Jr. | 340/174.1 G |
| 3,560,947 | 2/1971 | Franchini | 346/74 X |

*Primary Examiner*—Charles D. Miller
*Attorney*—Ronald T. Reiling et al.

[57] ABSTRACT

An address marker encoder and decoder for use in three frequency recording wherein the address marker encoder is capable of generating a unique marker which does not appear in any three frequency data pattern and wherein the marker decoder detects the written marker pattern. The marker pattern of bits is a series of pulses which are repeated in a pattern of 1.5T followed by 2T where T is defined as a data rate period. The second stage of a seven bit binary down counter having a clock rate of 2N pulses per second (where N is the data rate) provides the desired marker pulses. The marker decoder detects the bit marker pattern by providing a stage of 1.5T detector, another of 2T detector and three stages of a binary counter. The first two stages of the detector detect one occurrence of 1.5T followed by 2T. Any consecutive even number of 1.5T pulses are rejected at the first stage of detector. Any T pulses reset the entire decoder. Any 2T pulses reset the first stage detector whereas any 1.5T pulses reset the second stage of the detector. The number of detected pulses are counted by the binary counter to set the OK READ DATA signal.

5 Claims, 9 Drawing Figures

INVENTOR
DAE-WOO LEE
BY Nicholas Prasinos
ATTORNEY

INVENTOR
DAE-WOO LEE
BY
Nicholas Prasinos
ATTORNEY

INVENTOR
DAE-WOO LEE

BY Nicholas Prasinos

ATTORNEY

INVENTOR
DAE-WOO LEE
BY
ATTORNEY

| TRUTH TABLE EACH FLIP FLOP | | |
|---|---|---|
| tN | | tN+1 |
| J | K | Q |
| 0 | 0 | Qn |
| 0 | 1 | 0 |
| 1 | 0 | 1 |
| 1 | 1 | $\bar{Q}n$ |

INVENTOR
DAE-WOO LEE
BY Nicholas Prasinos
ATTORNEY

ADDRESS MARKER ENCODER IN THREE FREQUENCY RECORDING

BACKGROUND OF THE INVENTION

1. Field of the Invention

This invention relates to digital encoding and decoding systems and more particularly encoding and decoding systems for use in magnetic recordings utilizing the three frequency code.

2. Discussion of the Prior Art

In magnetic writing and reading as utilized in most data processing systems, there are two basic techniques of writing (recording) magnetically. One technique involves the magnetization of extremely small areas on the surface of a magnetic material having high magnetic retentivity. In the second technique small magnetic cores having high magnetic retentivity are utilized to store electric pulses within their volume. The first technique generally known as surface recording is utilized on such magnetic recording apparatus as tape drives, disc drives and rotating drums. In surface magnetic recording digital information in the form of discreet voltage levels vary the magnetic head recording current and hence, induce predetermined patterns of a remanent magnetic flux on the surface of the magnetic medium which is caused to move past the recording magnetic head.

During the read operation the magnetic medium is caused to move past a read head similar to the write head and the predetermined pattern of remanent magnetic flux on the surface of the magnetic medium induces voltages in the write head indicative of the magnetization pattern. The voltages are fed to appropriate circuitry where they are amplified, shaped and otherwise suitably processed for use by the computer.

When utilizing magnetic surface recording it is desirable to pack a great deal of bit information upon a given length of the magnetic medium. The measure of the number of bits per unit length is called the packing factor or bit density. It is desirable to have as great a bit density as is possible which requires small magnetized areas on the surface of the magnetic medium to be closely spaced. However a limit is reached wherein there is interaction of the magnetic fields between the magnetized areas, and erroneous information may be read by the read head. Hence a number of systems for magnetic recording of information on a surface of a magnetic medium have been developed to meet this requirement as well as other constraints imposed by the nature of magnetic reading and writing.

One early modulation scheme is the BR or return-to-bias scheme. This system consists basically of the presence of a positive pulse at clock time to represent a "1," and by the absence of a pulse at clock time to represent a "0." In this system the magnetic surface encounters two flux transitions per bit of stored information resulting in reduced storage packing density.

Another magnetic recording technique applicable to a single track of a recording medium is returned-to-zero (RZ) recording. In this system, the recording head receives positive pulse current to represent a "1" and negative pulse current to represent a "0" with no bias current supplied. However, with this method of recording, there is no increase of packing density over RB, but it is self-clocking since there is a change of state of the magnetic surface for each bit. It is, however, dependent on tape velocity since for a given pulse width the width of recorded flux depends on how fast the tape passes by the recording head. However, since there is always a transition, either positive or negative for a "1" or "0," it is not subjected to "drop-ins" or unwanted bits due to head-to-tape separation, but the circuitry is somewhat more complex than that utilized for RB recording. The most commonly used system of magnetic recording on a track in a magnetic medium is NRZ, or non-return-to-zero. Variations of this system are NRZ-M (non-return-to-zero mark), NRZ-I (non-return-to-zero-inverse), and NRZ-C (non-return-to-zero-change). In the NRZ system, generally, the current direction in the magnetic recording head is unimportant; what is important is that the current shifts from one level to another for a "1" so as to cause the flux to saturate at the opposite level of saturation. Hence, a "1" would be represented by the current in the magnetic head switching from $+I_m$ to $-I_m$, or from $-I_m$ to $+I_m$; whereas a "0" is represented by no shift. Note, that in this system only one flux change per bit is required resulting in a higher pulse packing density, but the system is not self-clocking, therefore a clock track must be provided along with a data track.

Another popular encoding system is the PE or PM systems (phase encoding or phase modulation). This system consists generally of a positive current transition at the bit cell center for a "1" and a negative transition for a "0." (A bit cell is herein defined as one interval along an information track when that track is divided into several equal lengths; and may also be regarded as time periods as the track moves beneath the recording head.) This system is sometimes known as "double-pulse" technique because two flux changes are recorded for each bit. With this system, despite the requisite two flux changes per bit, greater bit density is possible since the random sequence of "1's and 0's" and data produces wide frequency bands in NRZ type of recording, but only about one octave band width for the double pulse technique. Typically, for example, NRZ techniques may have packing densities of 800 bits per inch and bit rates of 120,000 per second, whereas phase modulation techniques reliably generate bit packing densities up to 1,500 bits per inch and bit rates of 300,000 bits per second.

A very popular variation of the "double-pulse" technique is the "2-frequency" modulation method. In this system there is a flux reversal at every bit boundary and if the bit cell is "0" there is no flux reversal between the boundaries of that cell; but if the bit cell is "1," then there is a flux reversal at the center point of the cell. Once again, the direction of flux reversal has no significance, but only its time or space relationship conveys its meaning. It can be seen here, that a series of "1's" result in twice the pulse repetition rate than with a series of "0's" — hence, the name "2-frequency" modulation. This system is self-clocking (the series of flux reversals constituting a recorded track is interpreted without reference to a separate clock track), provides greater packing density, and since the band width is kept substantially to 1 octave, relatively narrow band filtering may be used to improve the signal to noise ratio.

More recently, attention has been focused on a surface recording technique known as 3F or three frequency recording. Three frequency recording is a recording scheme which is defined by the following two encoding rules:

1. A flux reversal is made to occur in the center of every bit cell containing a binary ONE; and, 2. A flux reversal is made to occur between two adjacent bit cells containing ZEROS.

In the magnetic recording field there is no general arrangement regarding terminology with respect to 3F recording which is also known as Modified FM (MFM), Miller Encoding, Delay Modulation, Quarter-Half Cycle Modulation, and Modified NRZ.

Three frequency recording allows substantially greater (100 percent greater) packing density than currently employed FM Phase Encoded Techniques, and it is self-clocking.

With most of these systems of recording there is a need for generating and decoding a unique signal which provides the reference time for the beginning of data transfer. For example in NRZ recording a series of pulses having a period T preceeds any data transfer. This signal is sufficient for use with the NRZ encoding system since these series of pulses will not be mistaken for data under this system. However, in three frequency encoding a unique marker is necessary having a code which will not be mistaken for data under the three frequency encoding technique. The prior pulse repetition technique having constant period T, as will be seen later, will not meet this requirement.

OBJECTS

Accordingly, it is an object of the invention to provide an address marker encoder and decoder for use with three frequency recording.

It is a more specific object of the invention to provide an address marker decoder for use in any three frequency data pattern which gives the reference time for the beginning of data transfer.

It is still a further specific object of the invention to provide a unique marker signal for use with three frequency recording for defining the reference time for the beginning of data transfer.

Still another object of the invention is to provide a new use for a seven-bit binary downcounter.

A further object of the invention is to provide a new use for an eight-bit shift register.

It is yet another object of the invention to provide a marker encoder and decoder for use in three frequency recording which is reliable, and has a low cost of manufacture.

Other objects and advantages of the invention will become apparent from the following description of the preferred embodiments of the invention when read in conjunction with the drawings contained herewith.

SUMMARY OF THE INVENTION

The invention herein disclosed comprises an address marker encoder and decoder for use in Three Frequency Recording. (The address marker is defined as that pattern of signals which gives the reference for the beginning of the data transfer). The address marker encoder is capable of generating a unique pattern of signals which do not appear in any three frequency data pattern. The marker pattern is a repetition of a series of pulses wherein the first pulse is separated from the second pulse by a period $1.5T$ and the second pulse is separated from the third pulse by a period $2T$, etc., wherein $T$ is defined as the data rate period.

In one embodiment of the invention, the second stage of a three stage seven bit binary down counter provides the unique pattern of marker pulses, whereas another embodiment of the invention comprises an eight stage parallel-in-serial-out shift register which is initialized by feeding in a predetermined pattern of bits which is then shifted out of the shift register in the unique marker code herein described.

A marker decoder comprises one stage of a $1.5T$ detector, another stage of a $2T$ detector and a third stage of binary counter. The first two stages of the detector detect a series of pulses which are first separated by a period $1.5T$ followed by a period $2T$. Any consecutive even number of $1.5T$ pulses (which never occurs in the marker pattern) are rejected at the first stage of the detector. Any pattern of pulses having a period $2T$ reset the first stage detector and any pattern of pulses having a period $1.5T$ reset the second stage of the detector. Any pulses having a period $T$ reset the whole decoder.

When a valid address marker for three frequency recording is detected the number of detected patterns of pulses are counted by the binary counter. When two or more patterns of pulses having the pattern $1.5T$ followed by $2T$ are counted by the binary counter, the reference signal OK READ DATA to start reading the data is set.

DESCRIPTION OF THE PREFERRED EMBODIMENTS

General

Figure 3:
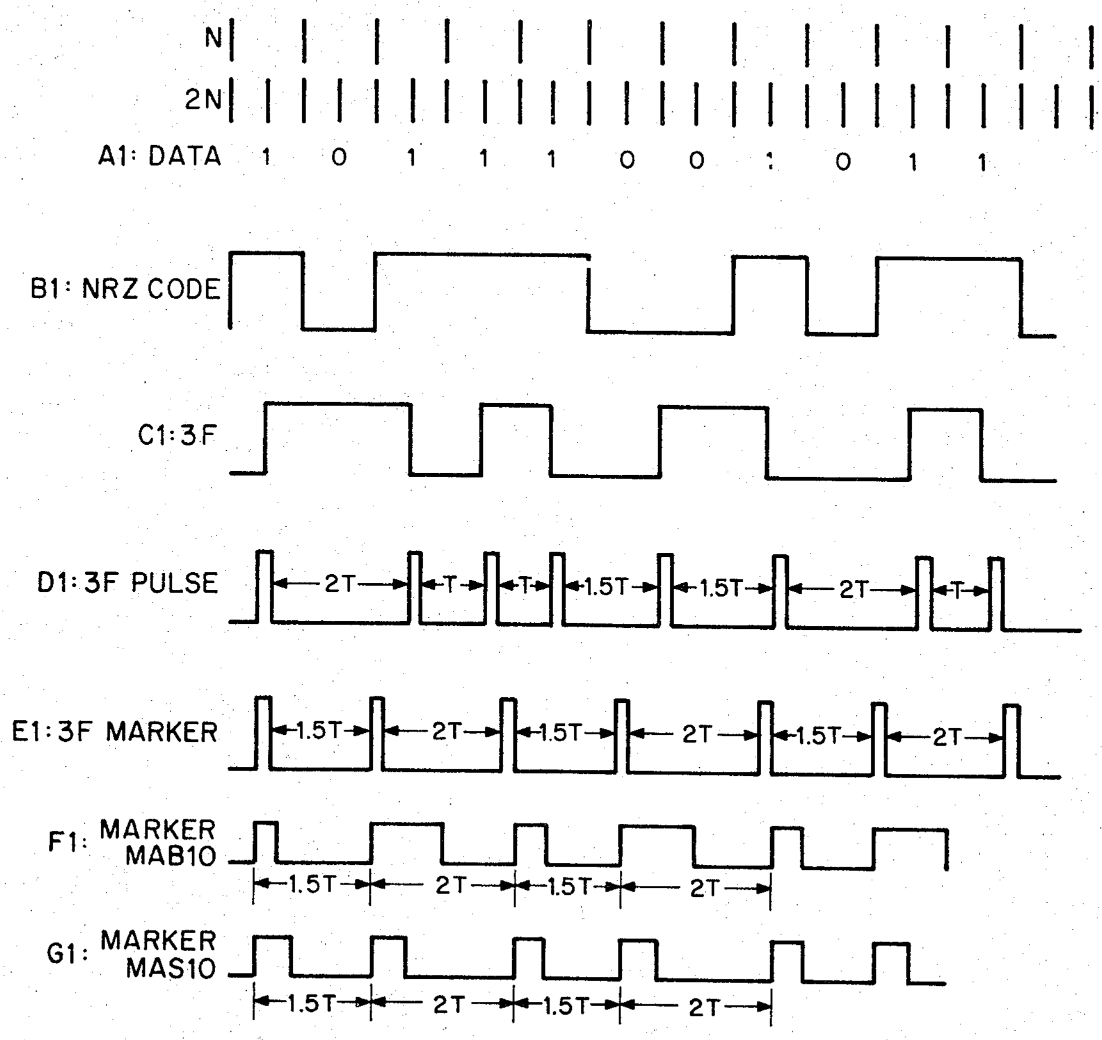
FIGS. 3 and 4 are timing diagrams utilized in explaining the invention.
Figure 4:
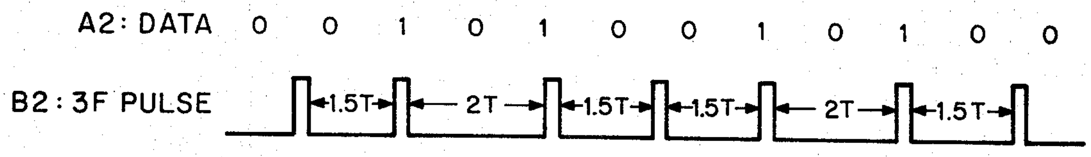

Referring to FIG. 3, a stream of data A1 is shown, which stream encompasses all the various combinations possible with the 0 and 1 bits for encoding into 3F code. This data is shown on timing graph B1 encoded in NRZ code utilizing the rules of NRZ coding. The three frequency coding curve C1 shows how this data may be coded utilizing the rules of three frequency encoding. In three frequency encoding a flux reversal also occurs at the middle of each bit cell representing a 1 and a flux reversal also occurs at the boundary between cells if, and only if, two adjacent bit cells contain 0's. Since it is possible to accomplish a flux reversal by applying an appropriate write current pulse, the pulses D1 represent the A1 data in 3F pulse form. Note that the first two pulses are separated by a period $2T$ the second and the third pulse is separated by a period $T$ and so on. It will be noted also from the 3F pulse pattern D1 that although a pulse pattern having a period $1.5T$ followed by a period $2T$ may appear once in a 3F pulse data pattern, this pattern cannot appear more than once because a spacing of $1.5T$ is produced by a OO pattern whereas a spacing of $2T$ is produced by a 101 pattern therefore a deliberate attempt to encode first a OO pattern to give us a $1.5T$ spacing then a 101 pattern to give us a $2T$ pattern repeated over and over again will not result in the expected pulse spacing of $1.5T$ followed by a $2T$followed by a $1.5T$ followed by a $2T$ etc. Rather it will appear as shown on FIG. 4. In FIG. 4 we have a OO followed by a 101 followed by a OO followed by a 101 followed by a OO etc. It will be observed when this is encoded in three frequency pulse code that the first pulse is separated from the second by a $1.5T$ period, the second is separated from the third by a $2T$ period, the fourth is separated from the third by a 1.5T period whereas the fifth is separated from the fourth by a $1.5T$ period spacing. Hence the unique marker code E1 of FIG. 3 which has a pattern of pulses first separated by a $1.5T$ period then separated by a $2T$ period will not be duplicated by any of the possible combinations of data patterns utilized in three frequency encoding. Therefore the address marker defined may be utilized to generate a reference signal to indicate the beginning of data transfer in three frequency code, since there is no possibility of confusing this marker with the data.

Figure 1:
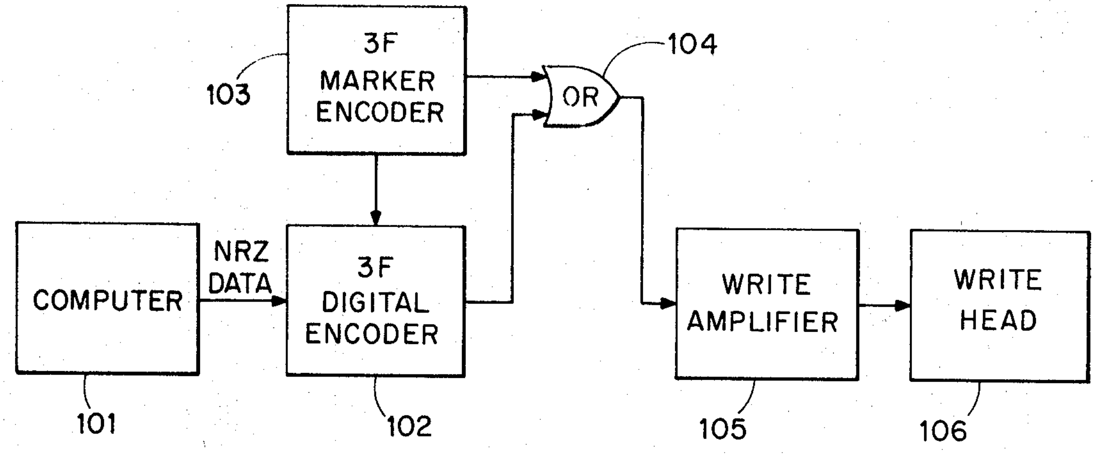
FIG. 1 is a block diagram of a write data system utilizing the invention.

Referring now to FIG. 1 there is shown in block diagram form an encoder which translates a conventional non return to zero digital information signal to a signal having the three frequency code, and utilizing the address marker encoder of the invention. (A typical three frequency encoder may be found in the patent to G. V. Jacoby U.S. Pat. No. 3,414,894.)

On FIG. 1 computer 101 provides NRZ data to a three frequency digital encoder 102. An address marker encoder 103 is OR'ed together with the three frequency encoder at OR gate 104. The signal from OR gate 104 is further processed by amplifying in a conventional amplifier 105 and applied to write head 106 for recording upon a recording medium.

Figure 2:
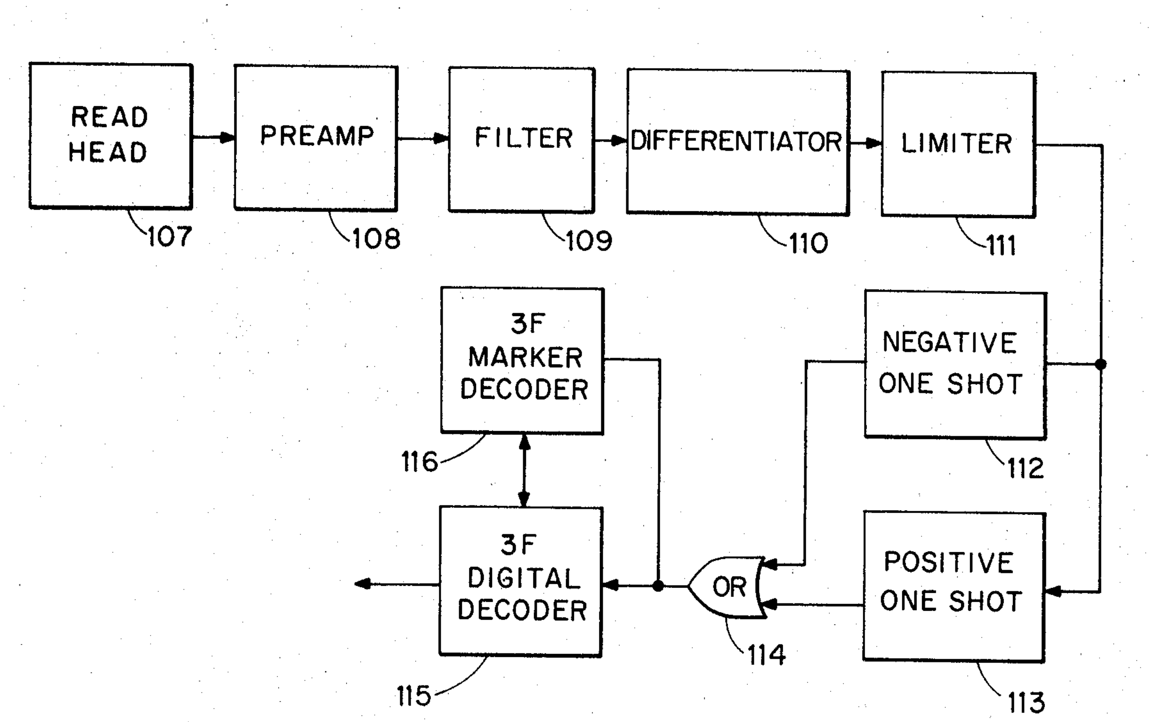
FIG. 2 is a block diagram of a read data system utilizing the invention.

FIG. 2 is a block diagram representation of a readback system utilizing a three frequency marker decoder and a three frequency digital decoder. (A typical three frequency digital decoder may also be found in above mentioned U.S. Pat. to Jacoby No. 3,414,894.) Referring to FIG. 2 the signal on a recording medium is read by read-head 107 and is applied to preamp 108 where it is amplified, and then applied to filter 109 which removes the normally observed high frequency noise. The signal is then processed through differentiator 110, which is utilized to convert all peaks (flux reversals) to zero crossings, as well as to more nearly equalize the signal amplitudes. The signal is then further processed in limiter 111 which serves to convert the zero crossings to rapid voltage revesals, which are subsequently utilized to trigger one shots 112 and 113 on the negative and positive voltage edge of the square wave reversals. These one shot outputs are logically OR'ed and sent to the three frequency digital decoder 115 and to three frequency marker decoder 116. The three frequency digital decoder reconverts the three frequency code back into NRZ code whereas the 3F marker decoder recognizes the unique marker code when present, and identifies the beginning of a record. The respective signals are then further processed in accordance with computer system demands.

One Embodiment of a Three Frequency Address Marker Encoder

Figure 5:
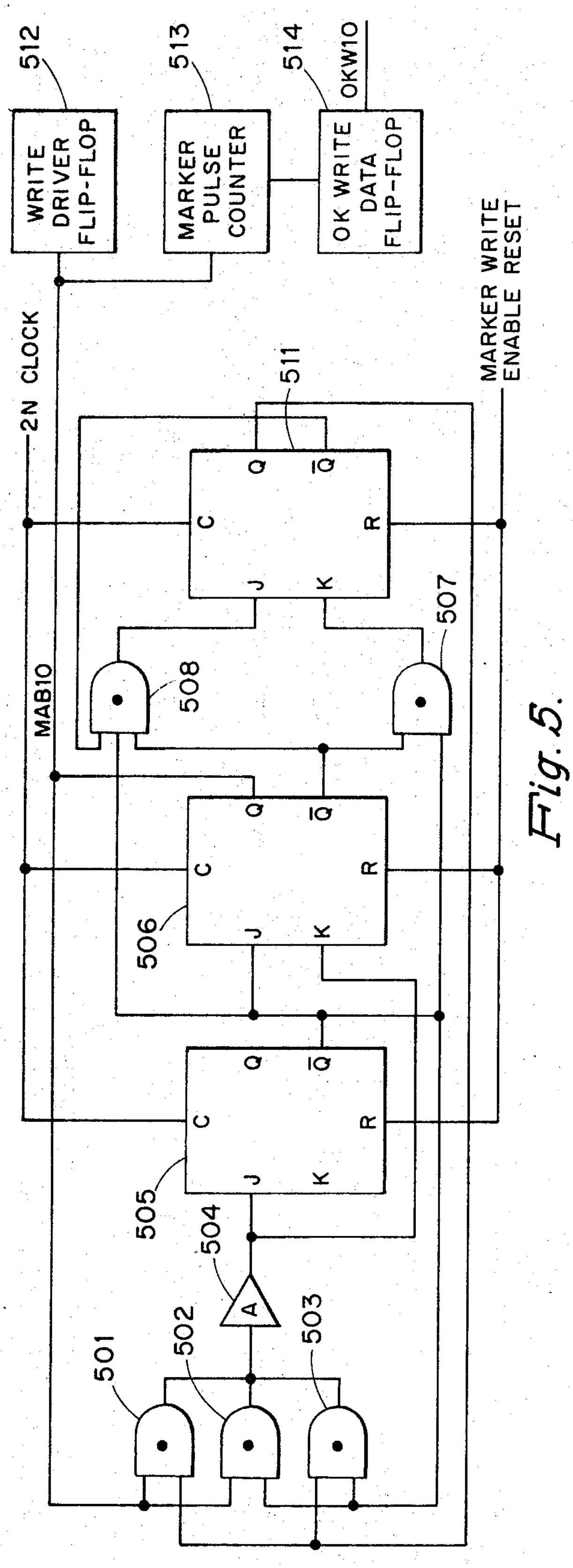
FIG. 5 is a logic block diagram of a seven bit binary down counter utilized in practicing the invention.

Referring to FIG. 5 a seven bit binary down counter having a clock rate of $2N$pulses per second (where $N$ is the data rate) is comprised of three JK flip-flops 505, 506 and 511, which typically may be of the Texas Instrument Type Ser. No. 7473 although any other type of JK flip-flop such as is found on page 37 of the book "Introduction to Digital Computer Design" by Herbert S. Sobel and published by Addison-Wesley Publishing Co., Inc. may also be utilized. Each flip-flop has a reset terminal R for resetting each one of the flip-flops, J and K terminals for receiving data; a C terminal for receiving clock pulses; and output terminals Q and $\bar{Q}$. The reset terminal of each flip-flop is coupled to a marker write enable line, whereas the clock terminal is coupled to a clock which provides clock pulses at a rate of $2N$. The J terminal of flip-flop 505 is coupled to the output of amplifier 504 which in turn has its input coupled to the output of AND gates 501, 502 and 503 which are in turn logically OR'ed together. The Q terminal of flip-flop 505 is coupled to one input terminal each of AND gates 502 and 503, and is also coupled to one each of the input terminals of AND gates 507 and 508, and is further coupled to the J terminal of flip-flop 506. The K terminal and Q terminal of flip-flop 505 are left open. The J terminal of flip-flop 506 is also coupled to one each of an input terminal of AND gates 507 and 508. The Q terminal of flip-flop 506 is coupled to one each of an input terminal of AND gates 501 and 502 respectively, and is also coupled to write driver flip-flop 512, and also to marker pulse counter 513. OK Write Data flip-flop 514 is coupled to marker pulse counter 513. The $\bar{Q}$ terminal of flip-flop 506 is coupledone each to an input terminal of AND gates 507 and 508 respectively. The output terminal of AND gate 507 is coupled to the K terminal of flip-flop 511 whereas the output terminal of AND gate 508 is coupled to the J terminal of flip-flop 511. The Q terminal of flip-flop 511 is coupled to one each of the input terminals of AND gates 501 and 503, whereas the $\bar{Q}$ terminal of flip-flop 511 is coupled to an input terminal of AND gate 508.

In operation the desired address marker code comprised as previously described of a pattern of pulse signals separated by a period of $1.5T$ followed by a period $2T$ which is repeated for a number of times, is abstracted from the Q terminal of the second flip-flop 506 of the seven bit down counter. The first step in generating the desired pattern of pulses is to reset all of the flip-flops 505, 506, 511, which sets all Q terminals to logical "zero" and all $\bar{Q}$ terminals to logical "one." The first state to consider of the seven bit down counter is the zero state. Since each flip-flop 505, 506 and 511 respectively have been initialized so that their $\bar{Q}$ terminals are set to logical zero whereas the Q terminals are set to logical one, AND gates 501 and 502 each having at least one of their input terminal coupled to the Q terminal of flip-flop 506 will not be enabled and their output signal will be low. Furthermore, AND gate 503 which has one of its input terminals coupled to the Q terminal of flip-flop 511 will also have an output signal which is low. The logically OR'ed output signals of AND gates 501, 502 and 503 is presented to the J terminal of flip-flop 505; hence the J terminal of flip-flop 505 is low. Since the K terminal of flip-flop 505 is open it is in the high state. Referring now to the Truth Table of FIG. 8 it is seen that when the J terminal is zero and the K terminal is one at time $T_N$, then the Q terminal at time $T_n + 1$ which will occur at the next clock pulse, will be zero. Hence at the next clock pulse at C the Q terminal of flip-flop 505 will remain 0.

The J terminal of flip-flop 506 is coupled to the $\overline{Q}$ terminal of flip-flop 505 which at reset time was set high; therefore, the J terminal of flip-flop 506 is high. The K terminal of flip-flop 506 being coupled to the output of amplifier 504 is low at reset time. Referring now again to Truth Table of FIG. 8 when the J terminal is a logical "one" or high and the K terminal is a logical "zero" or low at time $T_N$ or reset time, then at time $T_N + 1$ or clock time the Q terminal will go high or to a logical one. Similarly flip-flop 511 at reset time has its K terminal high, since the $\overline{Q}$ terminals at reset time of flip-flops 505 and 506 are high and their output signal is ANDed by AND gate 507 to produce a high signal at the K terminal of flip-flop 511. The J terminal of flip-flop 511 at reset time is also high since all the logical signals from terminals $\overline{Q}$ of flip-flops 505, 506 and 511 which are high, are ANDed by AND gate 508 to produce a high output signal which is applied to the J terminal of flip-flop 511. Referring once again to the Truth Table at FIG. 8, it is seen that when the J and K terminals at time $T_N$ are logical ones or high, then the Q terminal at time $T_N + 1$ or clock time will assume the state of the $\overline{Q}$ terminal which is high; therefore, at time $T_N + 1$ or clock time the Q terminal of flip-flop 511 will assume a high stage or a logical one. When a clock pulse is applied to the terminals of flip-flops 505, 506 and 511 after the reset time the Q terminal of flip-flop 505 will be low, the Q terminal of flip-flop 506 will be high, and the Q terminal of flip-flop 511 will also be high. Subsequent clock pulses will change the state of each flip-flop and a continuation of the analysis of the operation as described above will disclose the pattern shown on Table I below.

TABLE I

| State | Q Terminal FF505 | Q Terminal FF506 | Q Terminal FF511 |
|---|---|---|---|
| 0 | 0 | 0 | 0 |
| 1 | 0 | 1 | 1 |
| 2 | 1 | 0 | 1 |
| 3 | 0 | 0 | 1 |
| 4 | 1 | 1 | 0 |
| 5 | 0 | 1 | 0 |
| 6 | 1 | 0 | 0 |

It will be observed that the Q terminal of FF506 which is the second stage of the seven bit down counter outputs a succession of signals which when plotted on a time scale will resemble curve F1 of FIG. 3.

A Second Embodiment of Address Marker Encoder

Figure 6:
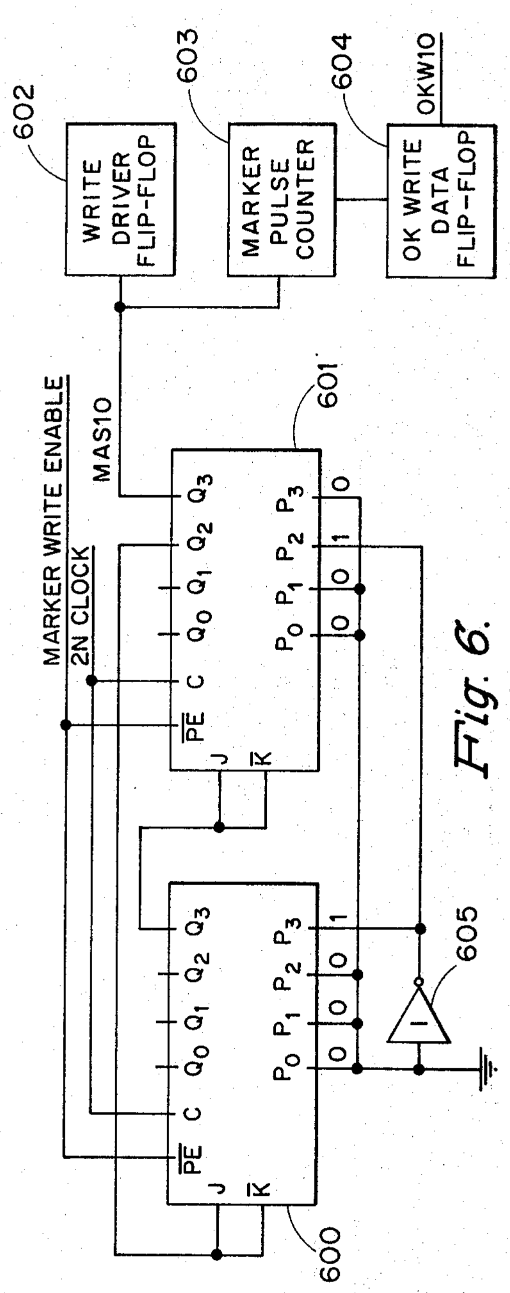
FIG. 6 is a logic block diagram of an eight bit shift register used in practicing the invention.

Referring to FIG. 6 two four bit parallel-in-serial-out shift registers 600 and 601 are coupled together so as to provide eight stages of a parallel-in-serial-out shift register. Fairchild Semiconductor Company type 9300 four bit shift registers may be used although any of the well known shift registers in the art can be used. Shift registers 600 and 601 have input terminals P0, P1, P2 and P3, respectively. Terminal P3 of shift register 600 is wired so that it will always input a logical "one" whereas inputs P0, P1 and P2 are wired to input logical "zeros." Shift register 601 has its terminals wired so that terminal P2 of shift register 601 always inputs a logical one whereas terminals P0, P1 and P3 always input a logical zero. This is accomplished as will be noted from FIG. 6 by having terminals P0, P1 and P2 of shift register 600 and terminals P0, P1 and P3 of shift register 601 coupled to ground whereas terminal P3 of shift register 600 and terminal P2 of shift register 601 is coupled to ground through an inverter 605, thus inverting the signal from a logical zero to a logical one.

The shift registers 600 and 601 also have output terminals Q0, Q1, Q2 and Q3, respectively but only the Q3 output terminal of shift register 600 is coupled to the J and $\overline{K}$ terminals of shift register 601 thus making this an eight bit shift register. The output terminal Q3 of shift register 601 is coupled to write driver flip-flop 602 and also to marker pulse counter 603 and OK WRITE DATA flip-flop 604. Terminal C of shift registers 600 and 601 respectively are the clock terminals where a clock pulse is applied to serially shift the data in this shift register one bit to the right. As each bit of data is shifted to the right at clock time the output signal MAS10 will be applied to write driver flip-flop 602 and marker pulse counter 603. Marker pulse counter 603 is coupled to OK write data flip-flop 604. The $\overline{PE}$ terminal of flip-flops 600 and 601 is coupled to the MARKER WRITE ENABLE line; when the $\overline{PE}$ signal is low it permits the parallel shifting in of data from input terminals P0, P1, P2 and P3 and when it is high it does not permit any parallel inputs of data from terminals P0, P1, P2 or P3 but it does permit the serial shifting of the data through the shift registers 600 and 601 respectively under control of the clock pulses.

In operation the eight bit parallel-in-serial-out shift register comprised of four bit shift registers 600 and 601 is initialized by shifting in the initial data permanently wired to the terminals P0, P1, P2 and P3 of each shift register respectively, and then this data is serially shifted through the eight bit shift registers to output signal MAS10 at terminal Q3 of shift register 601.

The pattern of this output signal will be as follows:

10010001.

When plotted using a time scale as the abscissa and a voltage scale as the ordinate the pulse pattern will resemble curve G1 of FIG. 3.

Marker Decoder for Three Frequency Recording

Figure 7:
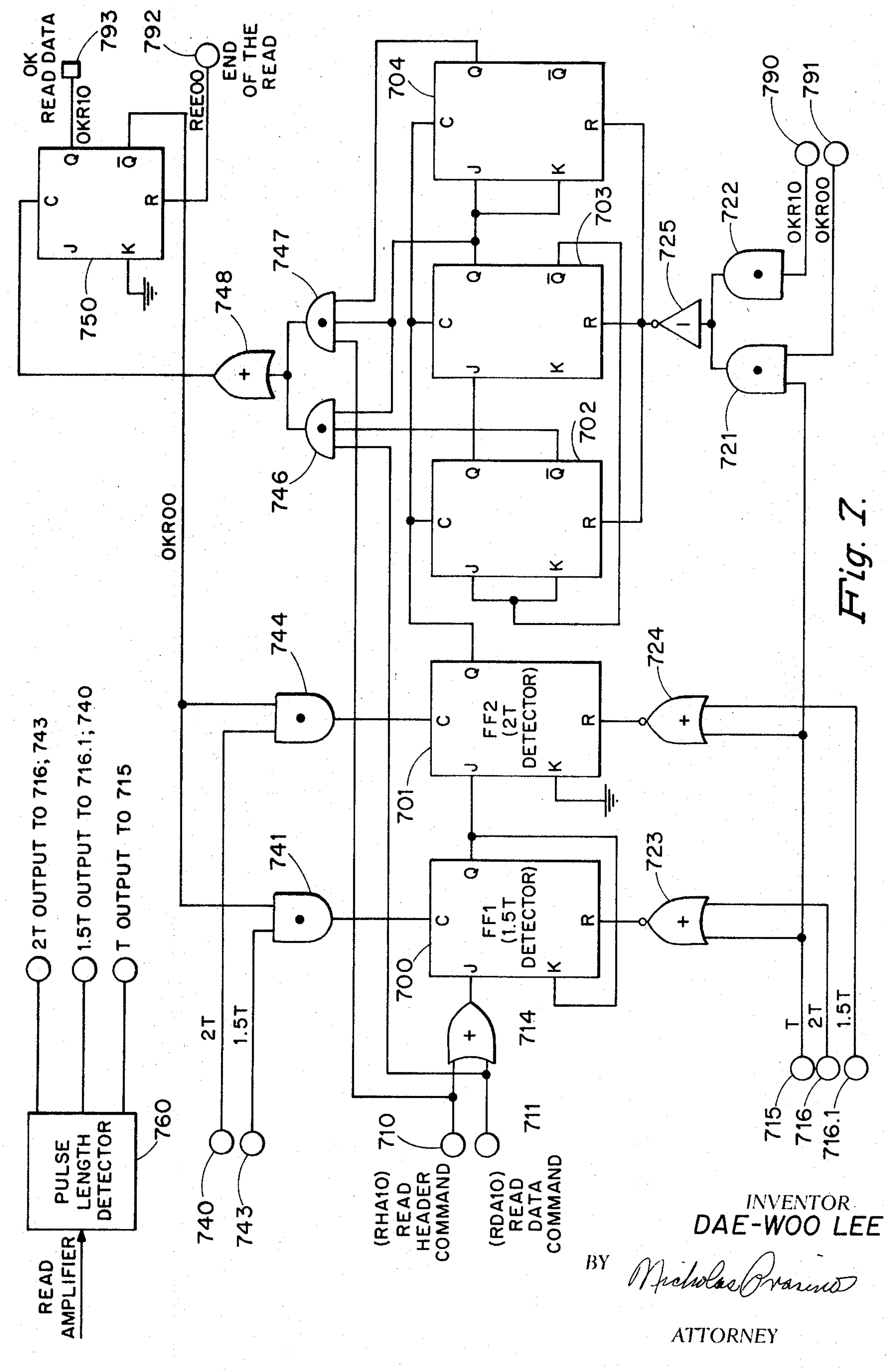
FIG. 7 is a logic block diagram of an embodiment of the invention.

The scheme of the marker decoder is to detect the written marker pattern which is the repetition of pulses having a period of 1.5$T$ followed by 2$T$. FIG. 7 shows the marker decoder which consists of a stage of 1.5$T$ detector 700, followed by another stage of 2$T$ detector 701, and finally by three stages 702, 703, 704 of a six count binary counter. the first two stages detect one occurrence of 1.5$T$ followed by 2$T$; whereas the binary counter counts the number of patterns having pulses spaced by 1.5$T$ followed by 2$T$.

In greater detail FIG. 7 shows a READ HEADER command terminal 710 and a READ DATA command terminal 711 each coupled to OR gate 714 whose output is coupled to the J terminal of flip-flop 700. The Q terminal of flip-flop 700 is coupled to the K terminal of flip-flop 700 and also to the J terminal of flip-flop 701. The K terminal of flip-flop 701 is grounded whereas the Q terminal of flip-flop 701 is coupled to the clock terminal of flip-flops 702, 703, and 704 respectively. The $\overline{Q}$ terminals of flip-flops 700, 701, and 704 are left open.

The J terminal of flip-flop 702 is coupled to the K terminal of flip-flop 702 and the combination are coupled to the $\overline{Q}$ terminal of flip-flop 703. The Q terminal of flip-flop 702 is coupled to the J terminal of flip-flop 703 whereas the Q terminal of flip-flop 703 is coupled to the J and K terminals of flip-flop 704. Also the Q terminal of flip-flop 702 is coupled to one input of AND gate 746; the Q terminal of flip-flop 703 is coupled to another input of AND gate 746 and also to an input of AND gate 747; the Q terminal of flip-flop 704 is coupled to an input of AND gate 747. Another input of AND gate 747 is coupled to the read header command line, whereas still another input terminal of AND gate 746 is coupled to the read data command line. AND gates 746 and 747 are ORed together and coupled to the input terminal of amplifier 748 whose output terminal is coupled to the clock terminal C of flip-flop 750. The K terminal of flip-flop 750 is grounded whereas the Q terminal output 793 of flip-flop 750 is the terminal that outputs the OK READ DATA signal OKR10. The reset terminal R of flip-flop 750 is coupled to END-of-READ terminal 792. The END-of-READ signal REEOO signifies the end of the Read command, whereas the OK READ DATA OKR10 signal is the reference signal to start reading of the data.

The $\overline{Q}$ terminal of flip-flop 750 is coupled to the input of AND gate 741. Also coupled to the input of AND gate 741 is 1.5*T* input terminal 740. The output of AND gate 741 is coupled to the C terminal of flip-flop 700. The $\overline{Q}$ terminal of flip-flop 750 is also coupled to the input terminal of AND gate 744. Also coupled to the input of AND gate 744 is the 2*T* input terminal 743. The output of AND gate 744 is coupled to the C terminal of flip-flop 701. Input terminal 714 for inputing a *T* pulse is coupled to the input terminals of NOR gates 723 and 724 and to AND gate 721 whereas input terminal 716 for applying a 2*T* pulse is coupled to the input terminal of NOR GATE 723; input terminal 716.1 Fpr applying a 1.5*T* pulse is coupled to the input terminal of NOR gate 724. NOR gate 723 is coupled to the reset terminal R of flip-flop 700. NOR gate 724 is coupled to the R terminal of flip-flop 701. AND gates 721 and 722 are ORed and coupled to the input terminal of inverter 725 whose output terminal is coupled to the R terminal of flip-flop 703. The OKROO signal is coupled to an input of AND gate 721 via terminal 791; the OKRIO signal is coupled to the input of terminal of AND gate 722 via terminal 790. Terminal 791 is coupled to the $\overline{Q}$ terminal of flip-flop 750, and terminal 790 is coupled to the Q terminal of flip-flop 750. (Coupling not shown on FIG. 7.)

In operation a series of pulses of period *T* precede the reading of a record and these pulses are applied on input terminal 715 which in turn are utilized through NOR gates 723, 724 and AND gate 721 respectively for resetting flip-flops 700, 701 and flip-flops 702, 703 and 704 respectively. A pulse length detector 760 (to be later more fully described) receives the data pulses and detects them with respect to their period *T*, 1.5*T*, and 2*T*.

The 1.5*T* signal is applied to input terminal 740 which is coupled to an input terminal of AND gate 741. Since and END-of-READ signal on terminal 792 resets flip-flop 750 thus making the Q terminal low and $\overline{Q}$ terminal high of flip-flop 750 and since the $\overline{Q}$ terminal of flip-flop 750 is coupled to another terminal of AND gate 741, AND gate 741 will be enabled when this condition prevails and will be applied to the C terminal of flip-flop 700. Furthermore, a read header command or a read data command on input terminal 710 and 711 respectively will cause the J terminal of flip-flop 700 to be high; then upon receipt of the previously mentioned clock pulse on C terminal of flip-flop 700, the Q terminal of flip-flop 700 will go high. (See Truth Table FIG. 8.)

The receipt of a 1.5*T* pulse can indicate that this may be a marker pulse. However, this must be allowed by a 2*Tl* pulse and the pattern repeated two or more times in order to actually be a marker pulse. In three frequency coded data a 1.5*T* pulse followed by another 1.5*T* pulse has data significance therefore the receipt of another 1.5*T* pulse on terminal 740 applied to the C terminal of flip-flop 700 the K terminal now being high and the J terminal being also high will cause the Q terminal of flip-flop 700 to become low again. (See Truth Table of FIG. 8 for this condition.) Hence, with the Q terminal of flip-flop 700 low, the J terminal of flip-flop 701 will also be low, and since its K terminal is grounded the Q terminal of flip-flop 701 will not change on the receipt of a 2*T* pulse. Hence a 1.5*T* pulse followed by a 1.5*T* pulse followed by a 2*T* pulse would not be recognized as a valid marker signal. However if the 1.5*T* pulse were immediately followed by a 2*T* pulse, the following sequence of events would occur:

With the Q terminal of flip-flop 700 high a 2*T* pulse applied to the input terminal 740 of AND gate 744, and having an enabling signal on the $\overline{Q}$ terminal of flip-flop 750, AND gate 744 will be enabled and the 2*T* signal will be applied to the C terminal of flip-flop 701. Since a 1.5*T*pulse has already set the Q terminal of flip-flop 700 high, then the J terminal of flip-flop 701 will also be high whereas the K terminal of flip-flop 701 will be low since it is grounded; with this condition prevailing the Q terminal of flip-flop 701 will go high upon the application of the 2*T* pulse on the C terminal of flip-flop 701. It will also be noted that a 2*T* pulse applied to terminal 716 will reset flip-flop 700 in order to initialize flip-flop 700 for the receipt of another 1.5*T* pulse.

When the Q terminal of flip-flop 701 is high, which is the case when it has received a 2*T* pulse after flip-flop 700 has received a 1.5*T* pulse, the signal is applied to the C terminals of flip-flops 702, 703 and 704 respectively. Flip-flops 702, 703 and 704 are reset when AND gates 721 and 722 are enabled. AND gates 721 and 722 are enabled when signals OKR00 and OKR10 are high respectively; therefore making inverter 725 low which in turn resets flip-flops 702, 703 and 704.

When the six count binary counter comprised of stages 702, 703 and 704 is initialized to its zero state all of its Q terminals are zero and all of its $\overline{Q}$ terminals are in a high stage or one. The JK terminals of flip-flop 702 are also high since they are directly coupled to the $\overline{Q}$ terminal of flip-flop 703. The J terminals of flip-flops 703 and 704 are low since each one is coupled to a Q terminal which has been initialized to zero. Consequently when a first pulse is received on the C terminal of each of flip-flops 702, 703 and 704 the Q terminal of flip-flop 702 will go high, the Q terminal of flip-flop 703 will be low since its J terminal is low and its K terminal is high, and the Q terminal of flip-flop 704 will stay low since its J terminal and K terminal are both low. (See Truth Table of FIG. 8.) With the Q terminals of both flip-flops 703 and 704 low AND gates 746 and 747 will not be enabled. Therefore no signal will be applied to the C terminal of flip-flop 750. It has been previously seen that a 1.5*T* pulse followed by a 2*T* pulse is not by itself unique. However, if this pattern is repeated more than once it is unique and can be used as a marker signal for the three frequency code. Therefore with the receipt of this pattern only once it is proper that no output signal be generated. However, if this pattern is repeated more than once an output signal should be generated signifying the address marker.

Assuming therefore that another pattern of 1.5*T* followed by 2*T* pulses is received; the Q terminal of flip-flop 701 will once again go high and be applied to the C terminal of each of flip-flops 702, 703 and 704. However now the Q terminal of flip-flop 702 is high and its JK terminals are high, and also the J terminal of flip-flop 703 is high since it is coupled to the Q terminal of flip-flop 702, and also the K terminal of flip-flop 703 is high since it is open; the J terminal and K terminal of flip-flop 704 is low since they are both coupled to the Q terminal of flip-flop 703. When a clock pulse is received the Q terminal of flip-flop 702 will remain high, the Q terminal of flip-flop 703 will go high and the Q terminal of flip-flop 704 will remain low. It can now be seen that if we have a read data command and with the Q terminals of both flip-flops 702 and 703 high AND gate 746 will be enabled and will provide an output signal to the C terminal of flip-flop 750.

This sequence of events continues to a count of six and is represented by Table II below:

TABLE II

| Count | Q Terminal 702 | Q Terminal 703 | Q Terminal 704 |
|---|---|---|---|
| 0 | 0 | 0 | 0 |
| 1 | 1 | 0 | 0 |
| 2 | 0 | 1 | 0 |
| 3 | 0 | 0 | 1 |
| 4 | 1 | 0 | 1 |
| 5 | 0 | 1 | 1 |

Figures 8, 9:
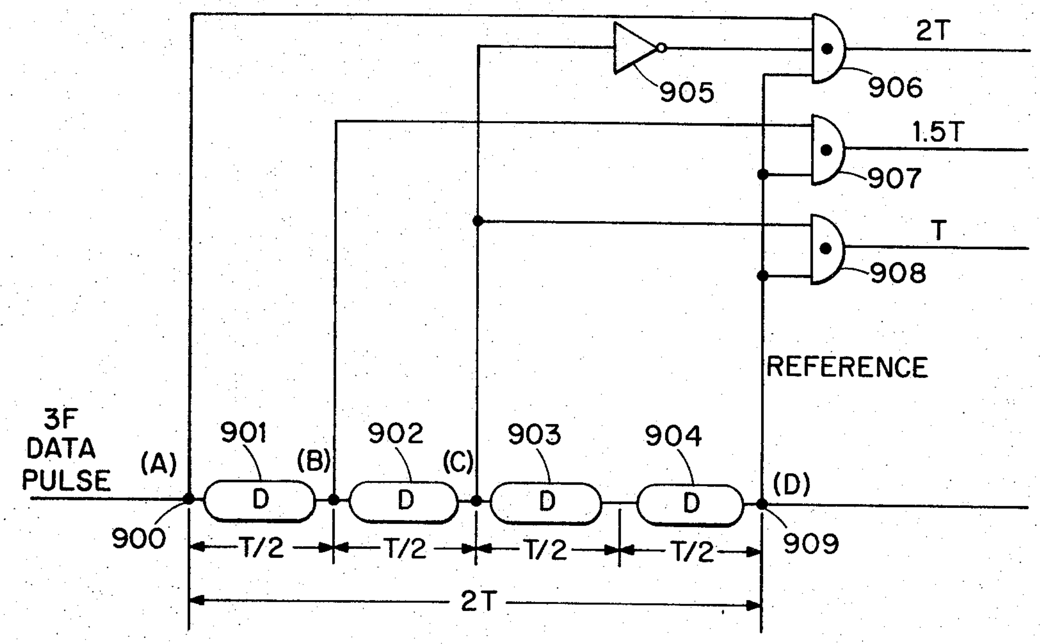
FIG. 8 is a truth table for the JK flip-flops utilized in the invention.
FIG. 9 is a logic diagram of a pulse-length detector.

Referring now to FIG. 9 a pulse length detector has four *T*/2 delay lines 901, 902, 903, and 904 coupled in series with the input of delay line 901 coupled to input terminal 900 and the output of delay line 904 coupled to the output terminal 909. The input of delay line 901 is coupled to an input of AND gate 906; the output of delay line 901 is coupled to an input of AND gate 907; the output of delay line 902 is coupled to an input of AND gate 908 AND to the input of inverter 905 whose output is coupled to another input of AND gate 906; whereas the output of AND gate 909 is coupled one each to an input of AND gates 906, and 908 respectively.

In operation a pulse applied to terminal 900 will be delayed by a period 2*T* when it reaches terminal 909. Using, therefore, terminal 909 as a point of reference (D), with respect to (A) we obtain a 2*T* pulse. The inverter 909 serves to reject two consecutive *T* pulses by disabling AND gate 906, which would otherwise appear as an erroneous 2*T* pulse.

Again utilizing terminal 909 as a reference point D, a 1.5*T* pulse period is detected by detecting pulses from B to D having a period 1.5*T*. A pulse at point (B) and one at point (D) would cause AND gate 907 to be enabled, indicating that a time period 1.5*T* exists between the two pulses. Similarly if a pulse exists at point (C) and one at point (D), AND gate 908 is enabled which indicates the time period T between them.

Having shown and described some embodiments of the invention including a preferred embodiment, those skilled in the art will realize that many variations and modifications can be made to produce the described invention and still be within the spirit and scope of the claimed invention.

What is claimed is:

1. A method of generating a marker code signal for use in three frequency recording utilizing a seven bit binary downcounter having three stages, each of said stages comprising a flip-flop having J and K input terminals and Q and $\overline{Q}$ output terminals, said method comprising the steps of:

a. initializing said seven bit binary down counter by resetting all flip flops whereby all Q terminals are set to logical zero and all $\overline{Q}$ terminals are set to logical one;

b. changing the state of each flip flop on successive sequential counts in accordance to the following table I;

TABLE I

| Count | Q1 | Q2 | Q3 |
|---|---|---|---|
| A | 0 | 0 | 0 |
| B | 0 | 1 | 1 |
| C | 1 | 0 | 1 |
| D | 0 | 0 | 1 |
| E | 1 | 1 | 0 |
| F | 0 | 1 | 0 |
| G | 1 | 0 | 0 |

where Q1, Q2, and Q3 are the Q output terminals of the flip-flops in the first, second and third stages respectively and where 0 indicates, a low electric signal on its respective Q terminal and 1 indicates a high electric signal on its respective Q terminal and A, B, C, D, E, F, and G represent count times;

c. removing from a predetermined stage of said seven bit binary downcounter a predetermined pattern of bits;

d. generating in response to said predetermined pattern of bits a marker code signal for use in three frequency recording.

2. A method of generating a marker code signal as recited in claim 1 wherein said pattern of bits are removed from the second stage of said seven bit binary downcounter and said second stage generates a pattern of bits in seven counts in accordance with the following table A:

TABLE A

| Count | Second Stage Bit Generation |
|---|---|
| 0 | 0 |
| 1 | 1 |
| 2 | 0 |
| 3 | 0 |
| 4 | 1 |
| 5 | 1 |
| 6 | 0 |

3. A method of generating a marker code signal as recited in claim 1 wherein said marker code signal immediately precedes three frequency encoded data.

4. An apparatus for recording binary information in patterns of presences and absences of pulses encoded in 3*F* code in consecutive positions along a track so that a stream of 3*f* encoded binary information is preceded by unique marker signals comprising:

a. a seven bit binary downcounter having three stages, each stage comprised of JK flip-flops each flip-flop having J and K input terminals and Q and $\overline{Q}$ output terminals and with the $\overline{Q}$ output terminal of the first flip-flop coupled to the J input terminal of the second flip-flop, and with the J input terminal of the first flip-flop coupled to the K input terminal of the second flip-flop;

b. first, second and third AND gate means each AND gate means having at least two input terminals *a* and $\beta$ and an output terminal $\delta$, said AND gates means having their $\delta$ output terminals logically OR-coupled together and also coupled to the J input terminal of the first flip-flop, said first AND gate means and said second AND gate means having their $\alpha$ input terminals coupled together, said second AND gate means and said third AND gate means having their $\beta$ input terminals coupled together, and with the $\beta$ input terminal of the first AND gate means also coupled to the $\alpha$ input terminal of the third AND gate means;

c. fourth and fifth AND gate means, each AND gate means having at least two input terminals $\alpha$ and $\beta$ and an output terminal $\delta$, with the $\delta$ output terminal of the fourth AND gate means coupled to the J input terminal of the third flip-flop means and the $\delta$ output terminal of the fifth AND gate means coupled to the K input terminal of the third flip-flop means and with the $\alpha$ input terminal of the fourth AND gate means coupled to the $\overline{Q}$ output terminal of the third flip-flop means, also with the $\beta$ input terminal of the fifth AND gate means coupled to the J input terminal of the second flip-flop means the $\overline{Q}$ output terminal of the first flip-flop means and also the $\beta$ input terminals of the second and third AND gate means respectively, said fourth AND gate means also having its $\beta$ input terminal coupled with the $\alpha$ input terminal of the fifth AND gate means, said $\alpha$ and $\beta$ input terminals of said fourth and fifth AND gate means also coupled to the $\overline{Q}$ output terminal of the second flip-flop means, said fourth AND gate means also having a third input terminal $\gamma$ said third input terminal coupled to the J input terminals of the second flip-flop means the $\overline{Q}$ output terminal of the first flip-flop means and the $\beta$ input terminals of said second and third AND gate means respectively; and, d. a marker pulse counter coupled to the second stage of said downcounter.

5. An apparatus as recited in claim 4 including a recording transducer coupled to said downcounter.

* * * * *